W. B. M. BASHLIN.
WATER FAUCET.
APPLICATION FILED MAR. 8, 1906.
937,221. Patented Oct. 19, 1909.
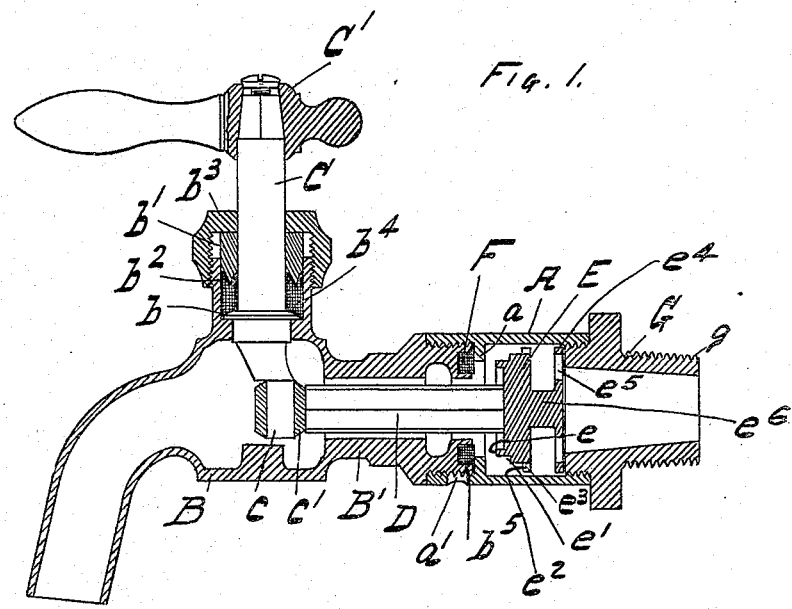

UNITED STATES PATENT OFFICE.

WILLIAM B. M. BASHLIN, OF WARREN, PENNSYLVANIA.

WATER-FAUCET.

937,221.

Specification of Letters Patent.

Patented Oct. 19, 1909.

Application filed March 8, 1906. Serial No. 304,816.

*To all whom it may concern:*

Be it known that I, WILLIAM B. M. BASHLIN, a citizen of the United States, residing at Warren, Pennsylvania, have invented new and useful Improvements in Water-Faucets, of which the following is a specification.

This invention relates to water faucets, and consists in certain improvements in the construction thereof as will be hereinafter fully described and pointed out in the claims.

The invention is illustrated in the accompanying drawings as follows.

Figure 1 shows a central section through the faucet. Fig. 2 an end view of the valve actuating slide. Fig. 3 an end view of the valve disk. Fig. 4 an end view of an auxiliary disk.

A marks the valve body and B the valve body extension. A valve stem C extends from without the valve body extension to within the same. It passes through the gland $b$. This gland has within it the packing material $b^4$ and on this packing material is arranged the follower $b'$, the edge of the follower being beveled both outwardly and inwardly, making it V shaped. The follower is forced into the gland by the flange nut $b^3$ in the usual manner. I prefer the follower having the V shaped edge in that it forces the packing $b^4$ both against the stem C and the outer wall of the gland. The stem is operated by a handle C', and is provided at its lower end within the extension B with an eccentric or crank $c$. A roller $c'$ is arranged on this eccentric. The extension B is screwed into the body A and the body A has a shoulder $a$ which engages the valve seat, formed of rubber or elastic material. The seat F also acts as a gasket between the extension B and body A. The valve E operates on this seat, having the main seating surface $e$ for this purpose. The seat F is arranged in an annular groove $b^5$ in the extension B forming an annular ring within the seat. The fluted slide is arranged in the passage B' in the body extension and communicates the action of the eccentric to the valve. The valve is normally subjected to the water pressure and this closes it, when relieved of the action of the eccentric. The roll $c'$ makes the action of the eccentric against the slide smoother. The valve disk E is provided with the auxiliary valve seating surface $e'$ which operates against the auxiliary seat $a$.

When it is desired to renew the seat F, the extension B is unscrewed from the body A, and this immediately exposes the seat F so that it may be removed and renewed. As soon as the extension B is moved out slightly, it allows the valve E to move forward with it so that the auxiliary seating surface $e'$ is brought to the seat $a$, forming a closure which is effective during the renewal of the seat. In order that any liquid that may escape after the extension is partially removed from flowing in various directions, I provide the opening $a'$ in the bottom of the body or barrel A which permits of the escape of the liquid in a downward direction.

In order to prevent water hammer, I provide the valve disk E with the shoulder $e^2$ which nearly fills the body A. This shoulder has the notches $e^3$ arranged in its periphery to restrict the water passage. I have found that this restricted passage may be made more efficient by adding the auxiliary disk $e^4$. This disk is secured to the disk E by the neck or stem $e^6$ and has in it a series of perforations $e^5$. By this construction water hammer is practically prevented.

I provide a screw threaded connecting piece G, which is screwed into the valve body A, and has the tapered thread $g$ by means of which the faucet may be secured to the ordinary pipe fitting.

What I claim as new is:

1. In a faucet the combination of the body extension; a valve operating stem extending from within the body extension to without the same and having an eccentric operating within the extension for actuating the valve; a valve body to which the extension is removably attached having an auxiliary valve seat therein; a main valve seat of less diameter than the auxiliary valve seat exposed by the removal of the extension said main valve seat being adjacent to the auxiliary valve seat; and a valve disk arranged to act on the main valve seat and having an auxiliary seating surface arranged to act on the auxiliary seat when the extension is removed.

2. In a faucet the combination of the body extension; a valve operating stem extending from within the body extension to without the same and having an eccentric operating within the extension for actuating the valve; a valve body to which the extension is removably attached having an auxiliary valve seat therein; a main valve seat of less diameter than the auxiliary valve seat carried by the extension and exposed by the removal of the extension said main valve seat being adjacent to the auxiliary valve seat; and a valve disk actuated by the eccentric, having a main seating surface arranged to act on the main valve seat and an auxiliary seating surface arranged to act on the auxiliary seat when the extension is removed.

3. In a faucet the combination of the body extension; a valve operating stem extending from within the body extension to without the same and having an eccentric operating within the extension for actuating the valve; a valve body to which the extension is removably attached having an auxiliary valve seat therein; a main valve seat of less diameter than the auxiliary valve seat exposed by the removal of the extension said main valve seat being adjacent to the auxiliary valve seat; and a valve disk, having a main seating surface arranged to act on the main valve seat and an auxiliary seating surface arranged to act on the auxiliary seat when the extension is removed; a slide extending from the eccentric to the valve and communicating the action of the eccentric to the valve.

4. In a faucet the combination of the body extension having its end provided with an inner annular ring adapted to form an inner support for a valve seat; a valve operating stem extending from within the extension to without the same and having an eccentric operating within the body for actuating the valve; a valve seat surrounding said ring on the end of the body extension, a valve body to which the extension is removably secured; a valve in said body adapted to operate on said seat; and a slide for communicating the action of the eccentric to the valve.

5. In a faucet the combination of a valve operating stem, having an eccentric for actuating the valve; a valve body; the shoulder $e^2$ on the valve having the notches $e^3$ therein, the shoulder forming approximately with the exception of the notches, a closure with the body of the valve; the disk $e^4$ carried with the valve and having the opening $e^5$ for the purpose described.

6. In a faucet the combination of the extension; valve actuating device carried by the extension; a valve body to which the extension is removably secured; a main valve; an auxiliary valve arranged in the valve body; and the connecting piece G secured to the body.

7. In a faucet the combination of the extension; the valve body A to which the extension is removably secured, said body having the auxiliary seat $a$; the main seat F acting with the seat $a$ to form a gasket between the parts; the valve E having the main seating surface and auxiliary surface for operating on the main seat and auxiliary seats respectively; and means for actuating the valve.

8. In a faucet the combination of the extension; a valve body secured to the extension; a valve seating exposed by the removal of the extension from the valve body; a valve in the valve body adapted to form a closure on the removal of the extension, the valve body being provided with the opening $a'$ for the purpose described.

In testimony whereof I have hereunto set my hand in the presence of two subscribing witnesses.

WILLIAM B. M. BASHLIN.

Witnesses:
B. F. PARKER,
H. C. LORD.